E. T. SPROUT.
Wire Fence.

No. 230,077.  Patented July 13, 1880.

Witnesses:
W. W. Mortimer.
Otto Stein.

Inventor:
E. T. Sprout,
per
F. A. Lehmann,
Atty

UNITED STATES PATENT OFFICE.

ERASTUS T. SPROUT, OF PICTURE ROCKS, PENNSYLVANIA.

WIRE FENCE.

SPECIFICATION forming part of Letters Patent No. 230,077, dated July 13, 1880.

Application filed January 17, 1880.

*To all whom it may concern:*

Be it known that I, ERASTUS THAYER SPROUT, of Picture Rocks, in the county of Lycoming and State of Pennsylvania, have invented certain new and useful Improvements in Wire Fences; and I do hereby declare the following to be a full, clear, and exact description of the invention, such as will enable others skilled in the art to which it pertains to make and use it, reference being had to the accompanying drawings, which form part of this specification.

My invention relates to an improvement in wire fences; and it consists in the combination of a circular flat spring, a rod as high as the fence, and around which the spring is placed, and a staple to hold the fence-wire and ring in place on the stick, as will be more fully described hereinafter.

Figure 1:
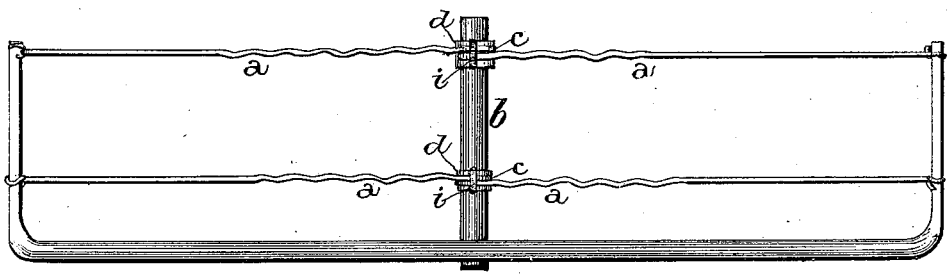
Figure 2:
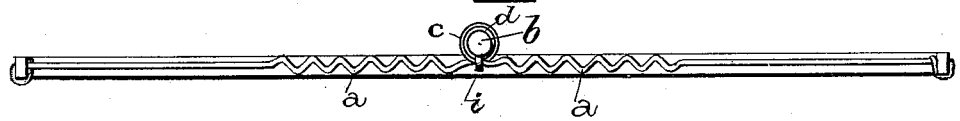
Figure 3:

Figure 1 is a side elevation of my invention. Fig. 2 is a plan view of the same, and Fig. 3 is a detail.

*a* represents the wires of the fence, of which there may be any desired number, and which wires are bent into a corrugated form for any desired distance on each side of the supporting-rods *b*, so as to compensate for the expansion and contraction caused by heat and cold.

Each wire at regular intervals has a loop, *c*, formed in it, and inside of each loop is placed a flat circular spring or cut ring, *d*, which rings are so shaped that the wires cannot easily slip off from them, and have their ends separated far enough from each other to allow the wires to contract freely without entirely closing them. These rings being made of steel, by their expansive force keep the wires constantly stretched, taking up all slack and allowing the wires to contract without any danger of breaking or pulling the posts out of plumb.

Through the springs *d*, around which the wires are looped, are passed the rods *b*, which are as high as the fence, and to which rods the wires are fastened by means of the staples *i*. These staples straddle over the wires where they cross each other after passing around the cut rings, and serve to prevent the wires from becoming detached from the rings and to keep the wires or rails of the fence equidistant apart. By thus passing the rods through the rings and keeping each wire in place on the rod no posts need be used except at the corners or on uneven ground, and thus the cost of the fence is greatly decreased. By making each wire corrugated in shape on each side of the rods, and then using the cut rings, the wires can be stretched when first put up, and will always keep about in the same condition.

Another advantage gained in using the cut rings consists in doing away with all necessity for cutting the wires at any point.

Having thus described my invention, I claim—

The combination of the wires *a*, rods *b*, cut spring-rings *d*, and staples or rivets *i*, substantially as set forth.

In testimony that I claim the foregoing I have hereunto set my hand this 15th day of January, 1880.

ERASTUS THAYER SPROUT.

Witnesses:
   C. R. RICHART,
   C. A. LITTLE.